3,002,813
METHOD OF PREPARING MONOPERSULFATES
Leonard R. Darbee, Grand Island, and James R. Kolczynski, Williamsville, N.Y., assignors to Food Machinery and Chemical Corporation, New York, N.Y., a corporation of Delaware
No Drawing. Filed July 15, 1959, Ser. No. 827,144
9 Claims. (Cl. 23—114)

This invention relates to the preparation of salts of monopersulfuric acid, and particularly to the preparation of the monopersulfates of ammonia and of the alkali metals and alkaline earth metals.

The monopersulfates have been produced by the neutralization of monopersulfuric acid, commonly referred to as Caro's acid, with a hydroxide or carbonate of the cation desired in the monopersulfate. This reaction, taught in Mellor: A Comprehensive Treatise on Inorganic and Theoretical Chemistry, vol. X, pages 482 to 485 (1930), and in United States Patent No. 2,802,722, is illustrated by the following formula:

$$2H_2SO_5 + M(OH)_2 \rightarrow M(HSO_5)_2 + 2H_2O$$

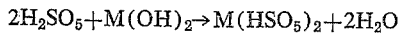

This reaction has been found useful; however, the monopersulfuric acid employed in the reaction normally is obtained together with a large amount of sulfuric acid, which can be removed only with difficulty. Accordingly, when the Caro's acid is neutralized in the formation of the monopersulfate, the sulfuric acid also is neutralized, with the result that a substantial amount of sulfate is obtained as an impurity.

An improved method of preparing the monopersulfates by reaction of hydrogen peroxide with dipersulfates is taught in copending patent application Serial No. 767,274, now Patent No. 2,955,020 in the names of Darbee and Kolczynski. This method avoids the difficulties encountered with the Caro's acid neutralization. However, it uses as precursor chemicals the active-oxygen-containing dipersulfates, which must be prepared as intermediates.

It has been desired to develop a method of preparing monopersulfates which avoids the difficulties encountered with the Caro's acid neutralizattion, and yet which does not require the preparation of the active-oxygen-containing intermediate dipersulfates.

It is a feature of this invention to provide a method of producing monopersulfates by the direct reaction of common chemicals which are available substantially free of contaminants.

It is a further feature of this invention to provide such a method which operates to produce concentrated products, without substantial loss of active oxygen.

In accordance with the method of this invention, the bisulfate of ammonia or of an alkali metal or alkaline earth metal is reacted with aqueous hydrogen peroxide at a temperature of about 50° to 110° C. and preferably at about 80° to 100° C., in the presence of a catalytic amount of a strong, oxygenated, inorganic acid, to provide the corresponding monopersulfate. It has been found that if these temperatures and catalyst conditions are observed, and at the same time the ratio of hydrogen peroxide to water in the final reaction mixture is caused to be at least about 1:1 on a molar basis, highly useful monopersulfate yields are obtained. Operation throughout in a reaction medium containing an excess of water over hydrogen peroxide on a molar basis, or in the absence of the acid catalyst or at too low or too high a temperature, has been found to result in reduced monopersulfate yields.

The reaction operates with substantially no loss of active oxygen, providing conversions of bisulfate to persulfate as high as 80% or even more. Surprisingly, these high yields of monopersulfate can be provided with a very low loss of active oxygen, despite the fact that the reaction is efficient only when temperatures above about 50° C. are used. This operation at high temperatures is a condition which would be expected to cause considerable destruction of the sensitive active-oxygen-containing reactant and product.

The various alkali metal and alkaline earth metal bisulfates, as well as ammonium bisulfate, may be employed in the present reaction. These materials may be introduced into the reaction mixture as such, or may be formed in situ from the sulfate and the requisite amount of sulfuric acid. Another source for the bisulfate is the corresponding pyrosulfate, which may be in situ hydrolyzed to the bisulfate. Operating conditions and availability of raw materials will determine the source of bisulfate to be used.

The strong oxygenated inorganic acids generally are useful as catalysts for the present reaction. However, the use of acids which introduce active-oxygen-destroying ions such as chlorine ions into the reaction mixture, should be avoided. Preferred acid catalysts are sulfuric acid, phosphoric acid, nitric acid and perchloric acid. The acids may be introduced as anhydrides, for example sulfuric acid may be introduced as $SO_3$, and the acid provided by in situ hydrolysis.

The acid catalysts are employed in a catalytic amount, which provides about 0.05 to 2 equivalents of hydrogen ion per kilogram of reaction mixture; the amount of acid required to provide this amount of hydrogen ion normally is on the order of 0.25 to 10% by weight of acid on the weight of the reaction mixture. Use of lower amounts of acid provides for inefficient reaction, whereas use of substantially more than 2 equivalents of hydrogen ion results in loss of active oxygen.

The reaction is carried out at about 50° C. to 110° C., and preferably at about 80° C. to 100° C. It takes place over about 5 minutes to 1 hour provided the hydrogen peroxide to water ratio is at the desired level. However, the reaction may be continued for longer periods without undue loss of product. Operation at lower temperatures reduces the yield of product, whereas operation at temperatures much above the indicated maximum tends to destroy some of the monopersulfate which has been formed in the reaction.

The hydrogen peroxide is employed in this reaction in at least an amount sufficient to react with the bisulfate present. Preferably it is used in excess over the amount required for reaction with the bisulfate, the amount of excess being determined by operational and handling requirements. Normally, the molar ratio of hydrogen peroxide to bisulfate employed will be from about 1:1 to 5:1. Continuous operation of the process is advantageous, and in this case about equivalent amounts of reagents will be employed. This is because in continuous operation the hydrogen peroxide will be continuously returned to the reactor, and only water removed.

The hydrogen peroxide employed in the present reaction preferably is aqueous hydrogen peroxide having a concentration of at least about 65% by weight. It has been found that for most efficient operation the molar ratio of peroxide to water in the final reaction mixture should be at least 1:1. Use of less concentrated hydrogen peroxide makes it necessary to remove an unduly large amount of water from the reaction mixture in order to provide this desired peroxide to water molar ratio, e.g. at least 1:1, and for this reason operation with highly concentrated peroxide is desirable. Hydrogen peroxide having concentrations below 65% by weight may be used, however, provided the reaction is conducted under conditions favoring selective removal of water.

One useful means of removing water during the reaction is to operate at a temperature and pressure at which water is removed as a vapor. Hydrogen peroxide is removed with the water, although as is well known the water has the higher vapor pressure, so that the residue is enriched in peroxide. When vaporizing water, and therefore peroxide, it is desirable to bleed air into the vapor system to dilute the hydrogen peroxide in the vapor to less than about 26 mole percent. Vapors in which the peroxide is present in more than this amount tend to decompose with violence.

Another suitable method of lowering the water content of the reaction mixture is to provide a drying agent in the reaction mixture. In any case, the final peroxide to water ratio can be determined readily by analysis or by consideration of the material balance of the reaction.

Where desired, stabilizers for active oxygen compounds, e.g. dipicolinic acid, oxides of tin, tetrasodium pyrophosphate and the like may be added to the reaction mixture or products. Use of such additives reduces any tendency of the reagents or products to undergo decomposition.

The efficiency of the present reaction can be determined readily. It has been found that very little of the active oxygen introduced as hydrogen peroxide is lost, either being recovered as unused hydrogen peroxide, or being converted to monopersulfate. Accordingly, analysis for recovered hydrogen peroxide and monopersulfate product directly indicates reaction efficiency. Another means of determining the efficiency of the reaction is to determine the yield of monopersulfate from bisulfate. It has been found the reaction will convert as much as 80%, or even more, of the bisulfate to monopersulfate in one pass. This combination of efficient utilization of the active oxygen and high bisulfate conversion makes the process economically attractive.

The monopersulfate product, while it is obtained in high concentrations and therefore is normally useful without further treatment, may be desired in higher concentrations. Where desired it may be isolated readily from the reaction mixture which contains also unreacted hydrogen peroxide, water and bisulfate. Normal separation techniques may be employed; for example, acid present may be neutralized and the product removed by selective dissolution. Alternatively, selective crystallization of the product may be carried out.

The following examples are included by way of illustration only, and are not intended to be limitative of reaction conditions, ingredients or results. The products were analyzed for hydrogen peroxide and monopersulfate contents by the Ceriometric method of Csanyi and Solymosi, Z. Anal. Chem. 142, pages 423 to 426, (1954).

EXAMPLE 1

Fifty grams (0.37 mole) of $KHSO_4$, 42 g. (1.1 moles) of 90% hydrogen peroxide, and 1.8 g. of concentrated sulfuric acid were introduced into a three-necked flask and heated for one hour at 98° C. and a pressure of 250 mm. of mercury. The flask was fitted with a stirrer, a source of dry air, and a vacuum system including a trap. Air at room temperature was bled through the flask during the reaction at a rate of 60 l. per hour, and 30.9 g. of 66% hydrogen peroxide was recovered from the vacuum system. The hydrogen peroxide-to-water ratio in the final reaction mixture was in excess of 9 to 1.

The reaction product contained 47.4 g. of $KHSO_5$, representing an 84% conversion of the $KHSO_4$ charged. Ninety-nine percent of the active oxygen introduced was recovered as $KHSO_5$ and $H_2O_2$.

The reaction mixture was purified by neutralization with 2.5 g. of $K_2CO_3$ in 3 ml. of water, and dried at 40° C. in a vacuum drier. A dry, solid product, containing 81.2 wt. percent of $KHSO_5$, 8.5% active oxygen, was recovered.

EXAMPLE 2

This example shows the affect of variations in temperature on the course of the reaction.

Individual batches, each comprising 50 g. (0.37 mole) of $KHSO_4$, 42 g. (1.1 moles) of 90% hydrogen peroxide, and 1.8 g. of concentrated sulfuric acid, were reacted according to the procedure described in Example 1, at the temperatures indicated in Table I. The reaction mixtures were then cooled to room temperature in a cold water bath. $KHSO_5$ product precipitated at room temperature. Conversions of $KHSO_4$ to $KHSO_5$, are given in Table I. Less than 5% of active oxygen was lost in any of these reactions.

Table I

|  | 30° C. | 50° C. | 70° C. | 75° C. | 80° C. | 90° C. | 100° C. |
|---|---|---|---|---|---|---|---|
| Percent Conversion ($KHSO_4$ to $KHSO_5$) | 8 | 22 | 40 | 46 | 55 | 84 | 85 |

EXAMPLE 3

This example demonstrates various catalysts which may be employed in the present reaction.

Batches comprising 50 g. (0.37 mole) of $KHSO_4$, 28 g. (0.74 mole) of 90% hydrogen peroxide, and 1 g. of the particular acid, were reacted as described in Example 1, in this case being stirred together for 20 minutes at 98° C. The reaction mixtures were then cooled to room temperature in a cold water bath. $KHSO_5$ product precipitated at room temperature. Conversions of $KHSO_4$ to $KHSO_5$ are given in Table II.

Table II

|  | $H_2SO_4$ | $H_3PO_4$ | $HNO_3$ | $HClO_4$ |
|---|---|---|---|---|
| Percent Conversion ($KHSO_4$ to $KHSO_5$) | 63 | 50 | 54 | 64 |

EXAMPLE 4

This example demonstrates the affect on yield of variations in the amount of acid catalyst.

Batches comprising 50 g. (0.37 mole) of $KHSO_4$, 42 g. (1.1 moles) of 90% hydrogen peroxide, and the amounts of concentrated sulfuric acid indicated in Table III, were reacted according to the procedure of Example 1. The reaction mixtures were then cooled to room temperature in a cold water bath. $KHSO_5$ product precipitated at room temperature. Conversions of $KHSO_4$ to $KHSO_5$, and amounts of active oxygen lost, are given in Table III.

Table III

| Equivalents of hydrogen ion per kg | 0 | 0.05 | 0.1 | 0.5 | 1 | 2 | 4 |
|---|---|---|---|---|---|---|---|
| Percent Conversion ($KHSO_4$ to $KHSO_5$) | 2 | 42 | 75 | 83 | 77 | 67 | 57 |
| Percent Active oxygen lost | None | None | None | 0.5 | 8 | 15 | 19 |

EXAMPLE 5

Fifty grams (0.42 mole) of $NaHSO_4$, 48.5 g. (1.28 moles) of 90% hydrogen peroxide and 1.8 g. of concentrated sulfuric acid were heated for 40 minutes at 98° C. and atmospheric pressure in a three-neck, 500 ml. flask fitted with a stirrer, a source of dry air, and a trap and condenser system. Air at room temperature was bled through the flask at a rate of 300 l. per hour. The hydrogen peroxide-to-water ratio in the final reaction mixture was in excess of 9 to 1.

The reaction product contained 38.9 g. of $NaHSO_5$, representing a 68.6% conversion of $NaHSO_4$ to $NaHSO_5$. Ninety-six percent of the active oxygen introduced was recovered as $NaHSO_5$ and $H_2O_2$.

EXAMPLE 6

Sixty-three grams (.55 mole) of $NH_4HSO_4$, 42 g. (1.1 moles) of 90% hydrogen peroxide, and 1.5 g. of concentrated sulfuric acid were heated for 45 minutes at 100° C. in an open beaker with stirring. The reaction mixture was then cooled to room temperature, with a resulting precipitation of $NH_4HSO_5$ product. The hydrogen peroxide-to-water ratio in the final reaction mixture was greater than 1:1.

The reaction product contained 29 g. of $NH_4HSO_5$, representing a 40% conversion of $NH_4HSO_4$ to $NH_4HSO_5$.

EXAMPLE 7

In this example the bisulfate, $Ca(HSO_4)_2$, was prepared in situ from 11.6 g. of $CaSO_4$ and 10.1 g. of $H_2SO_4$. To 20 g. (0.86 mole of the $Ca(HSO_4)_2$ prepared in this fashion, was added 8.4 g. (0.17 mole) of 70% hydrogen peroxide. The reaction was conducted as described in Example 6.

The reaction product contained 7.1 g. of $Ca(HSO_5)_2$, representing a 33% conversion of $Ca(HSO_4)_2$ to $Ca(HSO_5)_2$.

EXAMPLE 8

In this example, 27.5 g. of $MgSO_4$ and 22.4 g. of $H_2SO_4$ were reacted in situ to provide 50 g. (0.23 mole) of $Mg(HSO_4)_2$. To this was added 13.9 g. (0.37 mole) of 90% hydrogen peroxide. The reaction was conducted as described in Example 6.

The reaction product contained 21.8 g. of $Mg(HSO_5)_2$, representing a 38% conversion of $Mg(HSO_4)_2$ to $Mg(HSO_5)_2$.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Method of producing a monopersulfate comprising reacting together at a temperature of about 50° to 110° C. (*a*) a bisulfate from the group consisting of ammonium bisulfate, the alkali metal bisulfates, and the alkaline earth metal bisulfates, and (*b*) aqueous hydrogen peroxide, in the presence of sufficient amounts of an oxygenated inorganic acid to yield from 0.05 to two equivalents of hydrogen ion per kilogram of reaction mixture, said oxygenated acid being free of anions which catalytically decompose the active oxygen constituents, and wherein the molar ratio of hydrogen peroxide to water present in the final reaction mixture is at least 1:1.

2. Method of claim 1 in which the temperature is from 80 to 100° C.

3. Method of producing a monopersulfate comprising reacting together at a temperature of about 50° to 110° C. (*a*) a bisulfate from the group consisting of ammonium bisulfate, the alkali metal bisulfates, and the alkaline earth metal bisulfates, and (*b*) aqueous hydrogen peroxide, in the presence of sufficient amounts of an oxygenated acid to yield from 0.05 to two equivalents of hydrogen ion per kilogram of reaction mixture, said oxygenated acid being selected from the group consisting of sulfuric acid, phosphoric acid, nitric acid, and perchloric acid, and wherein the molar ratio of hydrogen peroxide to water present in the final reaction mixture is at least 1:1.

4. Method of claim 3 in which the temperature is from 80 to 100° C.

5. Method of claim 1 in which the bisulfate is ammonium bisulfate.

6. Method of claim 1 in which the bisulfate is potassium bisulfate.

7. Method of claim 1 in which the bisulfate is sodium bisulfate.

8. Method of claim 1 in which the bisulfate is calcium bisulfate.

9. Method of claim 1 in which the bisulfate is magnesium bisulfate.

References Cited in the file of this patent

Price: "Per-Acids and Their Salts," Longmans, Green and Co. New York, 1912, page 52.

UNITED STATES PATENT OFFICE
CERTIFICATE OF CORRECTION

Patent No. 3,002,813                      October 3, 1961

Leonard R. Darbee et al.

It is hereby certified that error appears in the above numbered patent requiring correction and that the said Letters Patent should read as corrected below.

Column 1, line 43, for "neutralizattion" read -- neutralization --; column 5, line 16, for "0.86 mole" read -- 0.086 mole --.

Signed and sealed this 3rd day of April 1962.

(SEAL)
Attest:

ERNEST W. SWIDER
Attesting Officer

DAVID L. LADD
Commissioner of Patents